UNITED STATES PATENT OFFICE.

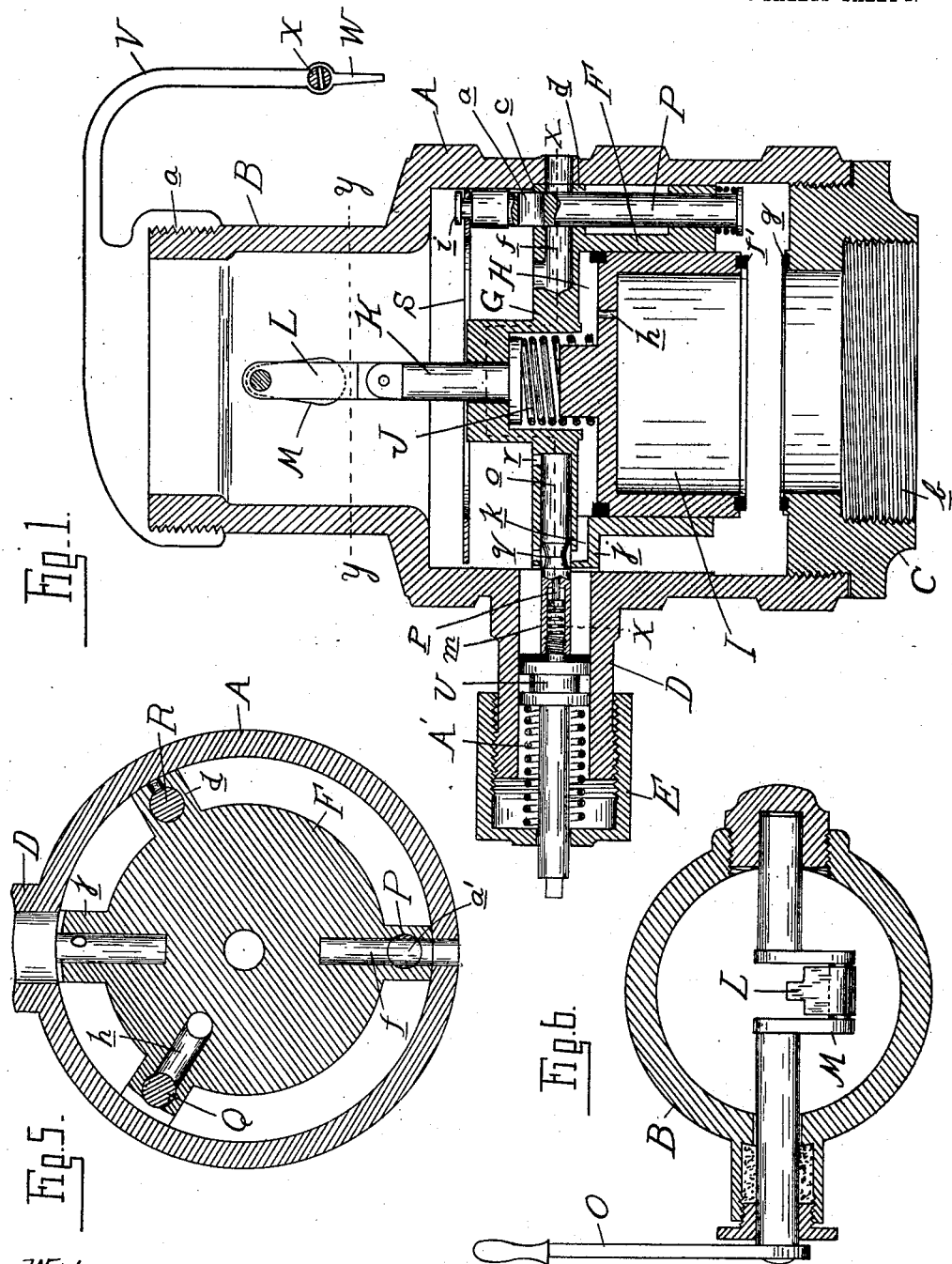

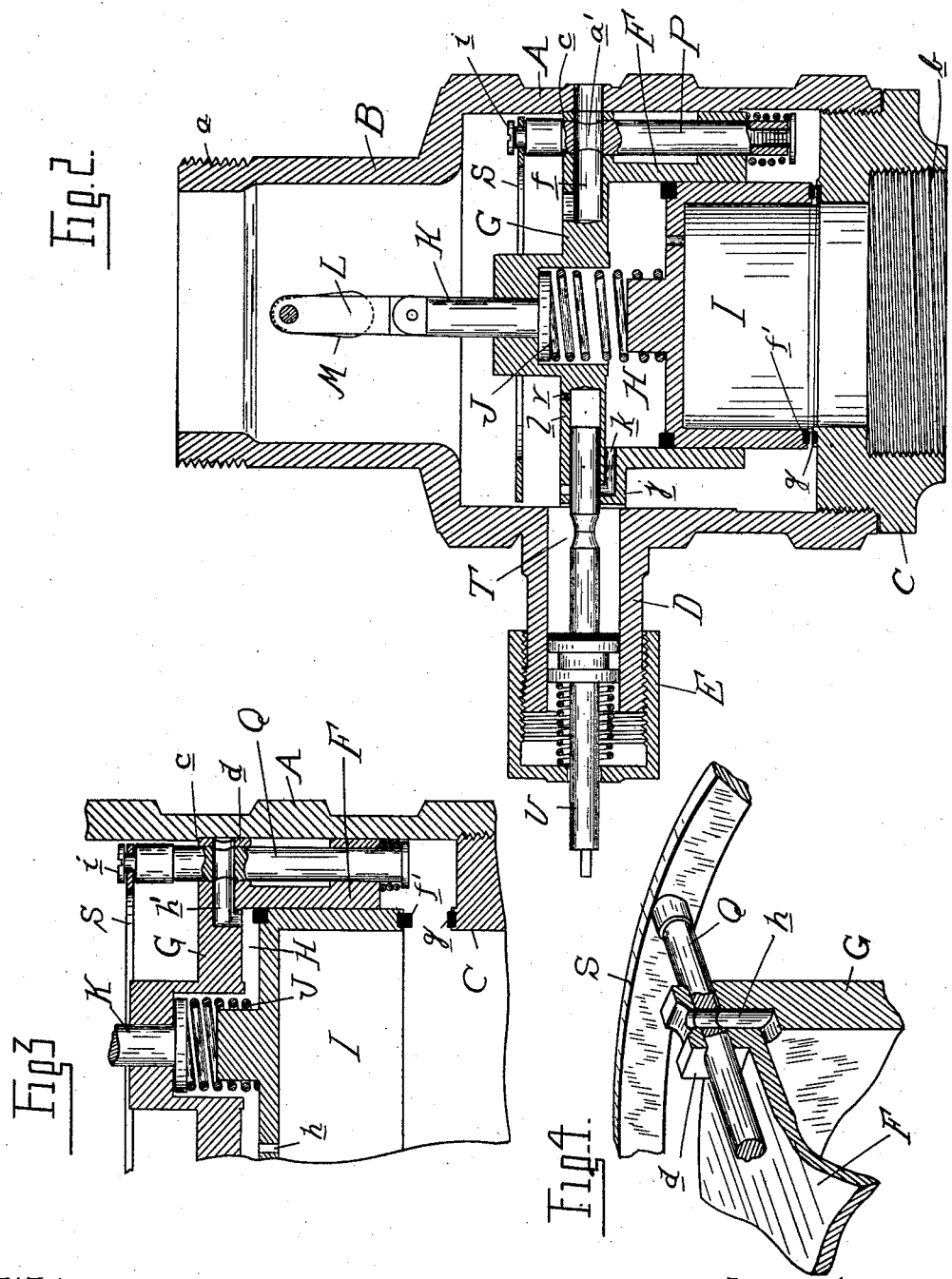

THADDEUS GALVIN AND EUGENE F. DUPART, OF DETROIT, MICHIGAN, ASSIGNORS, BY DIRECT AND MESNE ASSIGNMENTS, OF ONE-HALF TO SAID GALVIN AND ONE-HALF TO CHARLES C. SMITH, OF DETROIT, MICHIGAN.

VALVE MECHANISM.

1,058,960. Specification of Letters Patent. Patented Apr. 15, 1913.

Application filed May 21, 1909, Serial No. 497,428. Renewed September 3, 1912. Serial No. 718,394.

*To all whom it may concern:*

Be it known that we, THADDEUS GALVIN and EUGENE F. DUPART, both citizens of the United States of America, residing at Detroit, in the county of Wayne and State of Michigan, have invented certain new and useful Improvements in Valve Mechanisms, of which the following is a specification, reference being had therein to the accompanying drawings.

The invention relates to a valve mechanism, especially designed for use in connection with high-pressure hydrants for fire extinguishing purposes, to which the hose is adapted to be directly connected, and consists primarily in a mechanism including an automatically operating valve controlling the discharge from the hydrant, which in turn is controlled by the operator through the usual shut-off valve at the nozzle, the construction being such that as the nozzle valve is opened the automatic valve will also open, permitting the discharge, and upon the reversal of the nozzle valve the supply is cut off, thereby relieving the hose when not in use from active pressure.

The invention further consists in means for relieving the pressure in the hose or conduit after the water supply has been discontinued, to an extent as will render the hose sufficiently flexible to enable it to be readily and easily moved into the various positions desired.

The invention still further consists in the provision of means for varying the fluid pressure within the conduit while discharging; still further, in means for maintaining the fluid pressure within the conduit after the discharge has been cut off at a predetermined point less than the supply pressure; and, finally, in the peculiar arrangement and combination of parts, and in certain details of construction as will be more fully hereinafter set forth.

In the drawings illustrating the invention,—Figure 1 is a vertical central section through the valve mechanism, showing diagrammatically the hose or discharge conduit; Fig. 2 is a view similar to Fig. 1, showing the parts of the valve mechanism in a different position; Fig. 3 is a sectional view, showing one of the relief ports; Fig. 4 is a sectional perspective view, further illustrating the mechanism shown in Fig. 3; Fig. 5 is a section taken on line $x$—$x$ of Fig. 1; and Fig. 6 is a section taken on line $y$—$y$ Fig. 1.

In the drawings thus briefly described, the reference-letter A designates a suitable casing, adapted to contain the parts of the valve mechanism, preferably cylindrical in form. One end B is reduced, forming the discharge, and is externally threaded, as at $a$, to receive the hose. Its opposite end is provided with a bushing C, internally threaded, as at $a$, to receive the hose. Its opposite end is provided with a bushing C, internally threaded, as at $b$, to engage the usual nipple about the hydrant opening.

D represents a tubular extension communicating with the interior of the casing through one side thereof, provided with a cap E.

F represents a cylinder within the casing, abutting against a shoulder $c$ and spaced from the inner walls of the casing by lugs $d$ arranged in vertical pairs, preferably three in number, as shown in Fig. 5. The forward end of the cylinder is closed by a wall G.

I represents the valve, of cup-shaped construction, adapted to slide within the cylinder and to seat upon the bushing C. Suitable packings $f'$ $g$ are provided to form a tight joint, and an opening or port $h$ is formed in the outer wall of the valve leading from the interior of the latter into the valve chamber H.

J represents a coil spring preferably though not necessarily employed for forcing the valve to its seat, bearing against the valve at one end and against a headed pin or rod K at its opposite end, which extends through the closed end of the cylinder and connects by a link L with a crank M, the crank arm O of which is arranged upon the exterior of the cylinder, as shown in Fig. 6.

Within one of the vertical pairs of lugs $d$ is mounted a spring-pressed plunger rod P, which controls a port $f$ leading from the interior of the valve casing through one of the spacing lugs forming the plunger guide and the cylinder head into the valve casing interior in advance of the cylinder. This rod is recessed upon opposite sides at two diametrically opposite points, as indicated at $a'$, forming a passage about the rod to be brought into or out of communication with the port $f$ according as said port is to be opened or closed.

Mounted for reciprocation within an adjoining pair of lugs is a spring-pressed rod Q, similar in construction to the rod P described and controlling a port $h'$ leading from the valve chamber H downwardly through the cylinder head into the valve casing, the particular formation of this passage or port being more clearly illustrated in Fig. 4.

R is a third spring-pressed plunger rod, sliding in the remaining pair of lugs $d$, and S is a flat ring secured to the several rods by screws, as $i$.

A lug $j$ is formed upon the cylinder opposite the tubular extension D upon the valve casing, and leading from the valve chamber H through this lug into the casing proper beyond the cylinder is a port $k$ controlled by a pin valve T. This valve slides in a transverse passage $l$ formed in the lug last referred to and the cylinder head G, and is operated by a spring-pressed plunger U working in a tubular extension D.

The valve described is composed of a tubular member $m$ carried by the plunger, a solid cylindrical member $o$ adapted to fill the passage $l$ beyond the port $k$, and a connection $p$ in the form of a headed pin fixed upon the outer end of the cylindrical member and slidingly engaging the hollow member, the pin being of a length to permit travel of the tubular member independently of this complementary member, for a purpose hereinafter set forth. The ends of the valve sections meet opposite the port $k$, and the meeting portions are beveled, as at $q$, forming a passage about the pin registering with the relief port $k$.

$r$ represents a port leading outwardly from the extreme inner end of the passage $l$, permitting the reciprocation of the plunger member $o$ of the pin valve.

In Fig. 1, we have shown diagrammatically the discharge conduit, in the form of a hose V connected to the casing at one end and terminating at its opposite end in the usual nozzle W. X represents a suitable valve controlling the discharge of fluid through the nozzle.

In practice, the usual cap upon the hydrant nipple is removed, and the valve casing secured upon the nipple. The hose is then screwed upon the discharge end of the valve casing, and the operation of the valve mechanism within the casing is controlled by the nozzle valve.

Assuming that water has been discharged through the conduit and the stream cut off by the turning of the nozzle valve, the main inlet controlling valve is immediately seated by water pressure, the back pressure set up in the conduit by the closing of the nozzle valve exceeding the hydrant pressure, and the parts assume the position shown in Fig. 2. The plunger U will be held by the water pressure in its outer position against the tension of its spring, thereby closing the relief port $k$, while the springs upon the plunger rods, owing to the water pressure upon the connecting ring, will be free to operate, drawing the rods and connecting ring downwardly, thereby closing the relief port $h'$ and opening the drain port $f$. Upon opening this latter port, water within the discharge conduit drains out to a sufficient extent as to render the hose flexible, and thereby easily movable into the various positions desired.

Upon the opening of the nozzle valve, the fluid pressure within the conduit is at once relieved and the plunger operates through its spring, forcing the pin valve into a position to open the relief port $k$ (Fig. 1). The water within the valve chamber H discharges through this port sufficiently to allow the main valve I to rise from its seat, thereby permitting the water to be discharged from the hydrant within the valve casing. This water pressure operating upon the plunger forces the same rearwardly, thereby again closing the relief port $k$, and at the same time the plunger rods are reciprocated by the water pressure upon the ring against the tension of their springs, closing the drain port and opening the passage from the valve chamber H into the main casing.

In order to guard against the too rapid closing of the relief port $k$ so that the main valve I will have sufficient opportunity to open, the two-part or sectional construction of pin valve is employed. The water from the valve chamber H flowing through the port $k$ immediately operates the pin valve, but only the section $m$ thereof, which travels a considerable distance, the port $k$ remaining open the meanwhile, before the controlling portion of the valve is moved, thus affording ample time for the main valve to rise from its seat and the parts to operate in a positive manner.

Through the agency of the crank M, the throw or movement of the main valve I may be limited, and in this manner the water pressure within the discharge conduit varied to any desired extent. This is a desirable feature of construction in the particular form of valve mechanism described, as it allows a full or partial stream to be discharged through the nozzle without operating the nozzle valve, this latter being objectionable as in the event that the size of the stream is attempted to be regulated by the nozzle valve the drain port will be opened to a greater or less extent, causing the discharge of the water from outside the casing.

While we have provided means for relieving the pressure within the closed discharge conduit by way of drainage, it is not desirable to drain out more water from the hose than will make the latter sufficiently flexible to be moved. Means are therefore provided for maintaining the water pressure within the closed conduit at a predetermined point below the working pressure, the means in this instance being the plunger spring A' which may be of such tension as to perform the desired results.

Attention is directed to the fact that the main valve controlling the casing inlet is operated entirely by the water pressure, and that the spring described is not essential to its operation. It is preferably employed in connection with the valve to act upon the latter in case the valve sticks within the casing.

What we claim as our invention is,—

1. In a valve mechanism, the combination with a casing having an inlet and outlet, a valve chamber in the casing provided with a relief port leading into the casing, a pressure actuated ported valve within the valve chamber controlling the inlet end of the casing, and a valve operable by the pressure of fluid in the casing for controlling the relief port.

2. In a valve mechanism, the combination with a casing having an inlet and outlet, a valve chamber therein provided with complementary relief ports leading into the casing, a pressure actuated ported valve within the chamber controlling the casing inlet, and automatically acting valves for controlling the relief ports.

3. In a valve mechanism, the combination with a casing having an inlet and outlet, a valve chamber therein provided with a relief port leading into the casing, a valve controlling said relief port, a spring normally positioning said valve to open the relief port, a piston operatively connected to said valve and exposed to the pressure of the fluid in said casing, and a valve movably supported in said valve chamber and controlling the inlet to said casing.

4. The combination with a casing attachable to a source of fluid supply, of a discharge conduit leading therefrom, automatically operating mechanism within the casing controlling the discharge into the conduit, a valve for closing the conduit controlling the operation of the automatic mechanism, and means for partially draining the conduit to relieve the pressure therein, said means acting automatically upon the closing of its valve.

5. The combination with automatically operating fluid control mechanism attachable to a source of fluid supply, of a discharge conduit connecting therewith, a valve for the conduit controlling the discharge therefrom and the operation of the automatic mechanism, and means for varying the fluid pressure within the discharge conduit.

6. In a valve mechanism, the combination with a casing having an inlet and an outlet, of a valve chamber therein provided with complementary relief ports, a ported valve within the chamber controlling the casing inlet, and spring-pressed plunger valves controlling the relief ports.

7. In a valve mechanism, the combination with a casing having an inlet and an outlet of a valve chamber therein provided with complementary relief ports leading outwardly within the casing, a valve for said chamber controlling the casing inlet, and automatically operating valves for the relief ports acting to successively open the ports upon the opening of the inlet valve, and to close one of said ports after the initial opening movement of said inlet valve has been effected.

8. In a valve mechanism, the combination with a casing having an inlet and an outlet and a drain port formed in its wall, of a valve-controlled conduit connecting with the casing outlet, a valve chamber within the casing provided with valve-controlled ports, a ported valve within the chamber controlling the casing inlet, and a valve for the drain port acting to open and close said port automatically upon the closing and opening respectively of the inlet valve.

9. In a valve mechanism, the combination with the valve casing provided with an inlet and an outlet, of a cylinder fixed within the casing, a head for the cylinder having complementary relief ports extending therethrough, a ported valve within the cylinder controlling the casing inlet, and spring-pressed plunger valves controlling the relief ports.

10. In a valve mechanism, the combination with a casing having an inlet and an outlet, of a headed cylinder fixed within the casing, a cylinder head having formed therein complementary relief ports leading respectively within the cylinder to the exterior of the casing, a ported valve within the cylinder controlling the casing inlet, spring-pressed plunger valves controlling the complementary cylinder ports, and a connection between the valves compelling their simultaneous operation.

11. In a valve mechanism, the combination with a casing provided with an inlet and an outlet, of a valve chamber within the casing provided with complementary valve-controlled relief ports, a ported valve working within the chamber controlling the inlet, and means for limiting the opening movement of the valve.

12. In a valve mechanism, the combination with a casing having inlet and outlet openings and a transverse tubular projection intermediate its ends, of a valve chamber within the casing provided with complementary relief ports, a ported valve within the chamber controlling the inlet, a spring-pressed plunger working within the tubular projection, a sectional valve operated by the plunger controlling one of the relief ports, the valve sections having a limited relative movement, and a spring-pressed valve controlling the complementary relief port.

13. In a valve mechanism, the combination with a valve casing having one end reduced and threaded for engagement with a conduit, a bushing fitted within the opposite end of the casing constituting a valve seat and internally threaded to engage the hydrant nipple, a cylinder fixed within the casing provided with a head having complementary relief ports leading from the cylinder interior outwardly within the casing, a ported valve working within the cylinder controlling the casing inlet adapted to seat upon the bushing, and spring-pressed plunger valves controlling the relief ports and cylinder head.

14. In a valve mechanism, the combination with a casing having an inlet and an outlet, of a valve chamber within the casing provided with complementary relief ports, a ported valve within said chamber controlling the casing inlet, and controlling means for the relief ports acting automatically to open and close the latter upon the opening and closing of the inlet valve.

15. In a valve mechanism the combination with a casing having an inlet and an outlet, a valve controlled nozzle in communication with the outlet of said valve casing, a cylinder in the valve casing having a closed upper end, a valve working in said cylinder and controlling the inlet of the valve casing, the upper portion of said cylinder constituting a chamber containing liquid under pressure to normally hold the valve to its seat, and means for relieving the pressure in said cylinder when the valve in the nozzle is open.

16. In a valve mechanism, the combination with a casing having an inlet and outlet, a valve controlled nozzle in communication with the outlet of the valve casing, a cylinder in the valve casing having a closed upper end, a valve working in said cylinder, and controlling the inlet of the valve casing, the upper portion of said cylinder constituting a chamber containing liquid under pressure to normally hold the valve to its seat, a relief valve in the upper portion of said cylinder, and pressure actuated means for actuating said relief valve when the valve in the nozzle is open.

17. In a valve mechanism, the combination with a casing having an inlet and an outlet, a cylinder in the valve casing closed at its upper end, a valve working in said cylinder and controlling the inlet of the valve casing, the upper portion of said cylinder constituting a chamber containing liquid under pressure to normally hold the valve to its seat, a relief valve in the upper portion of said cylinder, and means for actuating said relief valve including a piston exposed to the pressure in the valve casing and operatively connected to said relief valve.

18. In a valve mechanism, the combination with a casing having an inlet and an outlet, a cylinder in the valve casing having a closed upper end provided with a relief port therein, a valve working in said cylinder and controlling the inlet of the valve casing, the upper portion of said cylinder constituting a chamber containing liquid under pressure to normally hold the valve to its seat, a sectional valve controlling the relief port in the cylinder, the valves having a limited relative movement, and means controlled by the pressure in the valve casing for shifting said valve to open the relief port in the cylinder.

In testimony whereof we affix our signatures in presence of two witnesses.

THADDEUS GALVIN.
EUGENE F. DUPART.

Witnesses:
W. J. BELKNAP,
JAMES P. BARRY.

---

Copies of this patent may be obtained for five cents each, by addressing the "Commissioner of Patents, Washington, D. C."